Dec. 12, 1967  J. R. BUCK  3,357,710
EXPANDABLE MANDREL

Filed Oct. 30, 1964

INVENTOR.
JAMES R. BUCK
BY
Woodhams, Blanchard & Flynn
ATTORNEYS

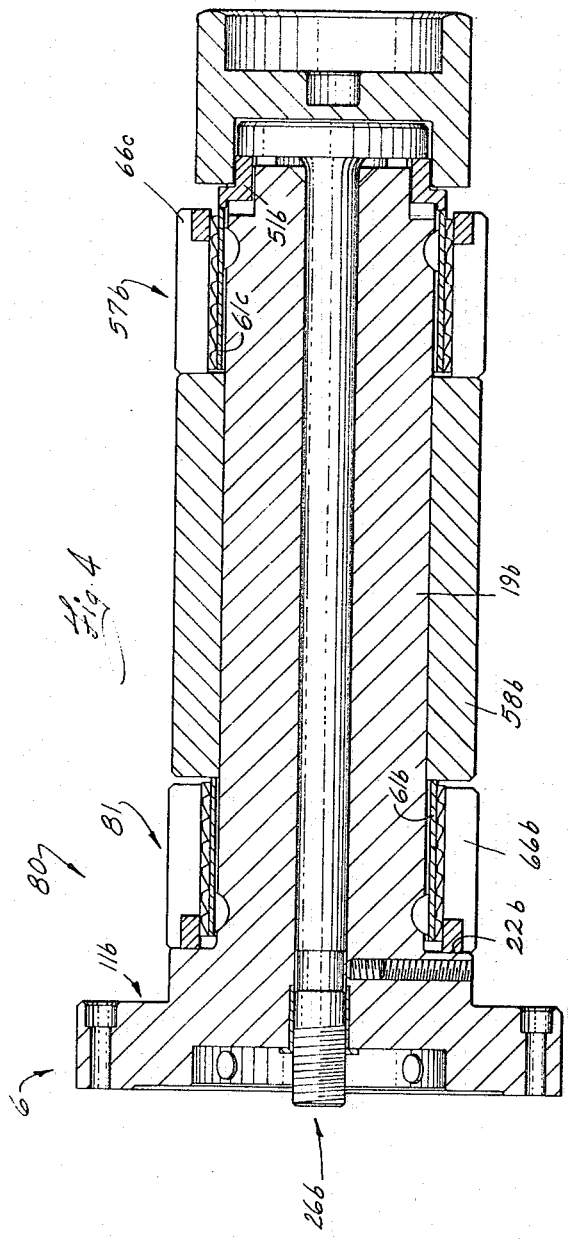

United States Patent Office 3,357,710
Patented Dec. 12, 1967

3,357,710
EXPANDABLE MANDREL
James R. Buck, Ross Township, Kalamazoo County, Mich., assignor to Buck Tool Company, Kalamazoo, Mich., a corporation of Michigan
Filed Oct. 30, 1964, Ser. No. 407,751
10 Claims. (Cl. 279—2)

This invention relates to an expandable workpiece holder construction and more particularly relates to an expandable mandrel including an axially spaced pair of radially expandable members.

The present invention is a further development of the mandrel construction of my United States Patent No. 3,117,797, filed May 2, 1962. The mandrel construction of the present invention is particularly intended for insertion into an elongated central opening in an elongated workpiece and for internally gripping the workpiece by expansion within said opening.

The expandable mandrel construction embodying the invention is particularly adaptable to mounting upon the face plate of a lathe for supporting a workpiece for rotation therewith. However the expandable mandrel construction embodying the invention is not limited to such mounting and may be used on other types of machine tools or in a fixed position. Prior mandrel constructions intended for such use have generally not been completely satisfactory for a variety of reasons. Certain of these prior mandrels cannot support the workpiece at points which are sufficiently widely axially spaced as to assure the stability of the workpiece and to preclude rocking thereof. Other prior mandrels have not been capable of or readily adaptable to supporting a workpiece having a stepped mandrel receiving opening. Many prior mandrels have been excessively expensive, some, for example limited to a particular workpiece opening size and shape and hence requiring a new mandrel for each different workpiece configuration whereas others have been excessively complex. Moreover, many prior mandrels whose expandable parts must move axially to expand cannot be readily modified to change their pattern of axial to radial movement, whereby to change the influence by expanding parts upon the axial position of the workpiece.

Accordingly, the objects of the invention include:

(1) To provide an expandable mandrel construction in which an axially spaced plurality of expandable units are supported on an arbor for insertion into an opening of a workpiece and in which said expandable units are radially expandable into contact with periphery of said opening for gripping said workpiece.

(2) To provide a mandrel, as aforesaid, in which reciprocable means are provided for energizing one of said expandable units, and each expandable unit upon being energized, energizes the succeeding one of said expandable units, in cascade so that expansive energization of the first of said units results in expansive energization of the remaining units, in which the maximum diameter achieved by each unit, within its range of possible expansion, is determined by contact with the workpiece opening and is substantially independent of the maximum diameters achieved by other units and in which the pressure exerted against the periphery of the workpiece opening will be substantially the same in all units despite minor variations in opening diameter at different axial locations in a given opening and at the same axial position in succeeding workpieces so that a given mandrel will properly grip openings having relatively wide tolerances and/or intentionally different diameters.

(3) To provide a mandrel, as aforesaid, capable of supporting a workpiece at axially spaced points within an elongated opening therein for preventing rocking movement of the workpiece on the mandrel.

(4) To provide a mandrel, as aforesaid, which is readily adaptable for supporting a workpiece having a stepped internal opening and in which the portions of the opening contacting the expandable units of said mandrel either differ in diameter or are separated by portions of differing diameter.

(5) To provide a mandrel, as aforesaid, in which the expandable units and/or parts thereof are interchangeable with units or parts of differing axial lengths and diameters and in which the expandable units on a particular mandrel may be of the same or differing axial lengths to meet the requirements of an individual workpiece.

(6) To provide a mandrel construction, as aforesaid, in which annular spacers may be placed on the arbor at the axial ends of the expandable units for varying the axial positioning thereof upon the arbor to adapt the mandrel construction to the particular requirements of the individual workpiece without modifying the arbor or the means for actuating the expandable units.

(7) To provide a mandrel, as aforesaid, in which at least some of the expandable units may be axially reversed on said arbor for varying direction of the axial component of motion thereof during radial expansion thereof.

(8) To provide a mandrel, as aforesaid, which can be manufactured economically of parts which are small in number and readily machined, which can be accurately made in a wide variety of sizes including long and short axial lengths and widely varying diameters.

(9) To provide a mandrel, as aforesaid, which may be made sufficiently sturdy as to be capable of a long, relatively trouble-free service life, which may be quickly and easily disassembled and reassembled for changing parts thereof and which is readily maintained by relatively unskilled personnel.

Other objects and purposes of this invention will be apparent to persons acquainted with apparatus of this general type upon reading the following specification and inspecting the accompanying drawings.

In the drawings:

FIGURE 4 is a central cross-sectional view substantially similar to FIGURE 1 and showing a modification thereof.

Figure 1:
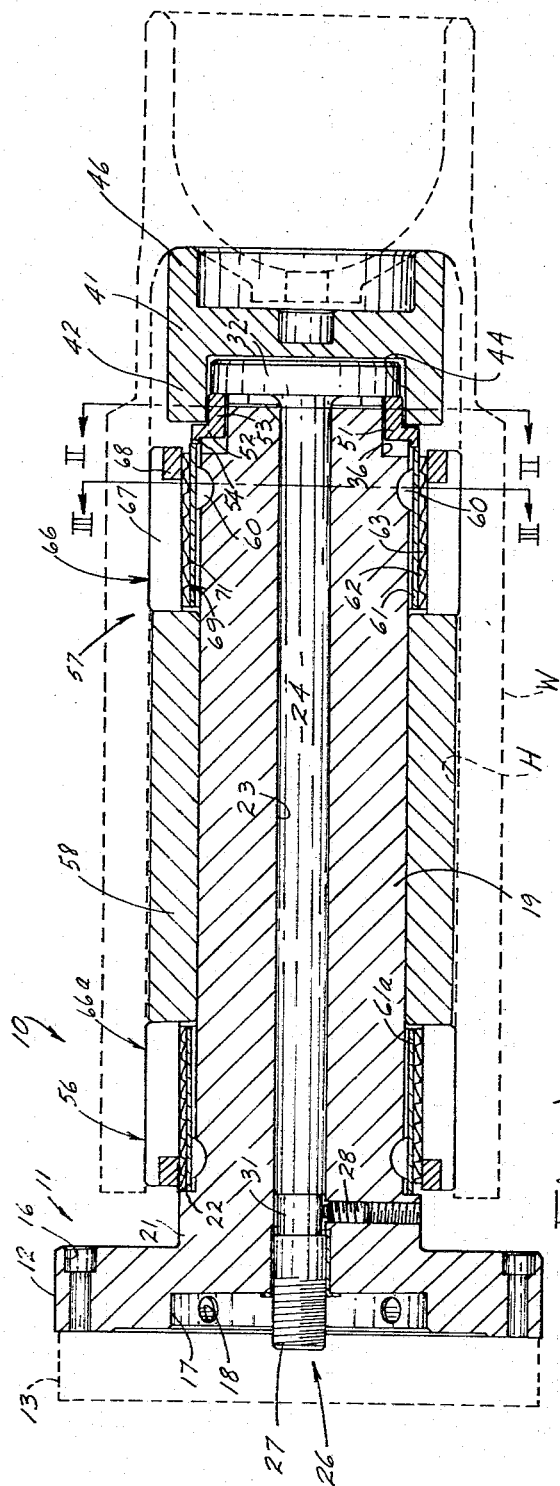
FIGURE 1 is a central cross-sectional view of a mandrel construction embodying the invention.

Certain terminology will be used in the following description for convenience in reference only and will not be limiting. The words "rightwardly" and "leftwardly" will designate directions in the drawing to which reference is made. The words "forwardly" and "rearwardly" will refer to opposite directions taken axially with respect to the mandrel constructions embodying the invention, such directions being to the right and left, respectively, in FIGURES 1 and 4. The words "inwardly" and "outwardly" will refer to directions toward and away from, respectively, the geometric center of the device and designated parts thereof. Said terminology will include the words specifically mentioned, derivatives thereof and words of similar import.

General description

In general, the objects and purposes of this invention are met by providing an expandable mandrel construction which includes an axially elongated arbor having an axially reciprocable actuating plunger extending from at least one end thereof. A plurality, here two, of expandable units are mounted on the arbor and each comprises an expandable sleeve mounted by coacting ramp means on a cylinder disposed on the arbor for rotation therewith so that relative axial movement between said sleeve and cylinder can cause expansion of the sleeve. Suitable transfer means are disposed between the plunger head and the adjacent cylinder so that said cylinder is axially movable by axial movement of the plunger. In the embodiments of the invention shown, a cylindrical spacer is disposed between the pair of expandable sleeves to transmit the motion of said plunger from the adjacent sleeve to one of the remaining sleeve and cylinder to allow cascaded expansion of said sleeves.

*Detailed description*

The mandrel construction 10 (FIGURE 1) which embodies the present invention is substantially similar to a mandrel construction of my copending application Ser. No. 407,744 and includes parts which have been described in detail therein. However, for convenience in reference, said parts will be briefly described hereinbelow.

Accordingly, the mandrel 10 includes a generally cylindrical arbor 11. A radial, preferably integral flange 12 at the rearward end of the arbor 11 is mountable upon a suitable mounting plate indicated at broken lines 13 which in turn may be mounted upon a portion of a machine tool such as upon the face plate, not shown, of a lathe. Screw holes 16 through the flange 12 allow coupling of the flange and mounting plate 13 by suitable screws, not shown. The flange 12 has a rearwardly opening recess 17 which may receive a pilot, not shown, on the mounting plate 13. Radial threaded holes 18 extend outwardly from the recess 17 for receiving set screws for centering the mandrel 10 with respect to the mounting plate 13. The elongated forward portion 19 of the arbor 11 is spaced from the flange 12 by an intermediate portion 21. The intermediate portion 21 is radially larger than the forward portion 19 for forming a forwardly facing radial shoulder 22.

The arbor 11 has a central opening 23 which snugly but slideably receives the rod 24 of the plunger 26. The rearward end 27 of the plunger 26 is preferably threaded for connection to any convenient actuating means capable of axially moving same such as a lathe drawbar. A set screw 28 is threaded radially through the peripheral wall of the midportion 21 into the opening 23 and into adjacency with the periphery of a portion 31 of reduced diameter on the rod 24. The set screw 28 permits axial movement of the plunger 26 normally only within a limited axial range and hence prevents inadvertent removal of the plunger 26 when the mandrel 10 is only partially assembled. The plunger 26 includes a radially extending, preferably integral head 32 at its forward end. A plurality, here six, of preferably identical grooves 36 extend axially rearwardly from the forward end of the arbor 11 and are preferably circumferentially evenly spaced. In the particular embodiment shown, the extreme forward periphery 37 (FIGURE 2) of the arbor 11 is slightly reduced in diameter to a location intermediate the ends of the grooves 36. A cylindrical positioning member 41 (FIGURE 1) has a rearwardly extending annular flange 42 which telescopes over the reduced forward periphery 37 of the arbor 11 and is held thereon by any convenient means such as the set screws 43 (FIGURE 2). The forward radial face of the arbor 11 and the flange 42 and body of the positioning member 41 define a chamber 44 (FIGURE 1) in which the head 32 of the plunger 26 is reciprocably disposed. In the particular embodiment of the invention shown, the positioning member 41 has a forwardly extending annular flange 46. When the arbor 11 is inserted into an opening H in a workpiece W indicated in broken lines in FIGURE 1, the flange 46 bottoms in the opening H to axially position the workpiece W with respect to the mandrel 10.

Substantially Z-shaped fingers 51 are disposed in the grooves 36. Each finger 51 has a radial portion 52 to the radially inner end of which is integrally connected a rearwardly extending, inner portion 53. The inner portion 53 lies within the groove 36, is prevented from radial movement out therefrom by the annular flange 42 of the positioning member 41 and is at its forward end normally contacted by the rearward face of the head 32 of the plunger 26. An outer portion 54 extends rearwardly from the outer end of the radial portion 52 of each finger 51 and lies radially beyond the adjacent periphery of the spindle portion 19. Rearward motion of the plunger 26 causes corresponding rearward movement of the fingers 51 toward the rearward end of the groove 36 and forward movement of the plunger 26 allows forward motion of the fingers 51 until the forward face of the radial portion 52 thereof contacts the rearward end of the annular flange 42. The above-mentioned structure is described in detail in my afore-mentioned copending application Ser. No. 407,744 and needs no further description here.

Turning now to the part of the mandrel 10 which more directly embodies the present invention, the elongated portion 19 of the arbor 11 supports a plurality, here two, of spaced, radially expandable units or assemblies 56 and 57. The units 56 and 57 are axially slideably disposed on the elongated spindle portion 19 and are separated from each other by a cylindrical spacer 58 which is snugly but slideably disposed on the spindle portion 19. The cylindrical spacer 58 is preferably of lesser outside diameter than the expansion units 56 and 57 so as not to interfere radially with the workpiece W.

The expansion units 56 and 57 are preferably substantially similar in construction for purposes of manufacturing economy. The unit 57 includes a cylinder 61 which is snugly but axially slideably positioned upon the spindle portion 19. The cylinder 61 is preferably positively circumferentially connected to the spindle portion 19 by a key 60 received in a suitable slot therein. Splines or the like may be used instead when the cylinder 61 is of sufficient wall thickness. A circumferentially evenly spaced plurality of axially aligned, toothed ridges 62 extends radially outwardly from the outer face of the cylinder 61. The ridges 62 are preferably identical and each comprises a plurality of axially identical teeth or ramps 63. In the particular embodiment shown, the ramps 63 each have relatively gently sloped (with respect to the axis of the spindle portion 19) rearward faces and relatively sharply sloped forward faces.

Figure 3:
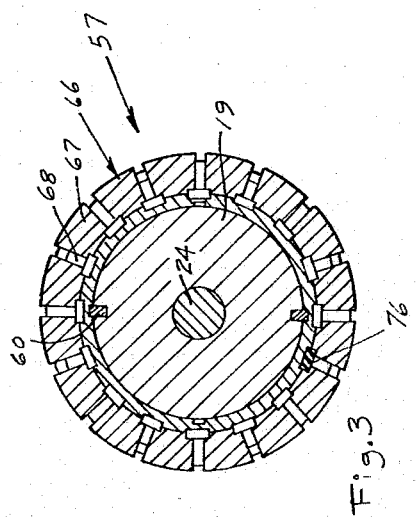
FIGURE 3 is a sectional view taken on the line III—III of FIGURE 1.

The expansion unit 57 also includes an expandable sleeve 66 which is preferably similar to that described in my aforementioned United States Patent No. 3,117,797. Briefly, the sleeve 66 (FIGURES 1 and 3) comprises a plurality of circumferentially spaced, axially extending bars 67, succeeding pairs of which are joined at alternating axial ends by axially short, circumferential webs 68. Thus, the bars 67 and webs 68 may be easily formed by axially slitting the cylindrical sleeve 66 from alternate axial ends thereof. The inner surface of each bar 67 carries a radially inwardly extending and axially aligned toothed ridge 69 thereon which comprises a plurality of substantially identical teeth 71. The teeth 71 correspond in size and shape to the teeth 63 of the cylinder 61. The sleeve 66 is normally axially oriented with respect to the cylinder 61 so that the slopes of the teeth 63 and 71 complement each other. Moreover, the circumferential spaces between the toothed ridges of each of the sleeve and cylinder are capable of receiving the corresponding toothed ridges of the other of said sleeve and cylinder to allow the sleeve 66 to be telescoped over said cylinder 61.

With the sleeve 66 located in the proper axial position on the cylinder 61, angular movement of the sleeve 66 intermeshes the teeth of the ridges 62 and 69 and the unit 57 achieves its assembled state. Tangential loading of the sleeve 66 with respect to the cylinder 61 will require keys such as that indicated at 76 (FIGURE 3) between one or more pairs of corresponding toothed ridges on the unit 57 to maintain said ridges in radial alignment. In such a state relative axial movement between the sleeve 61 and cylinder 66, in a direction which causes the gently sloped rearward sides of the teeth 63 to bear upon the gently sloped forward sides of the teeth 71, will result in expansion of the sleeve 66.

In the normal contracted state of the unit 57, the cylinder 61 extends forwardly past the forward end of the sleeve 66 and into contact with the rearward end of the outer portion 54 of the fingers 51. Also, the rearward end of the sleeve 66 extends rearwardly past the rearward end of the cylinder 61 to bear on the cylindrical spacer 58.

The expandable unit 56 is in this embodiment identical to the expandable unit 57. Thus, in the following discussion, parts of the unit 56 will be referred to by the same reference numerals used for corresponding parts of the assembly 57 but with the suffix *a* added thereto. The axial orientation of the unit 56 is opposite that of the unit 57 above discussed. Hence, the forward end of the sleeve 66*a* bears on the rearward end of the cylindrical spacer 58 while the forward end of the cylinder 61*a* is normally spaced therefrom. The rearward end of the cylinder 61*a* abuts the forwardly facing shoulder 22 on the arbor 11 for preventing rearward movement of said cylinder 61*a*. The rearward end of the sleeve 66*a* is spaced from said shoulder.

Although the ramp system above described is preferred for expanding the units 56 and 57 it is fully contemplated that the units 56 and 57 may include other suitable arrangements capable of expanding same due to the same external actuation. Moreover, it is fully contemplated that the units 56 and 57 may be energized by any convenient means other than the fingers 53 herein disclosed, such as, for example, a nut threadedly received on the rightward end of the spindle 19.

In the particular embodiment shown, the cylinder 61*a*, if desired, need not be supplied as a separate unit but may be made integral with the elongated spindle portion 19. Such integration would make unnecessary the forwardly facing shoulder 22. However, for reasons of manufacturing cost reduction and adaptability in use, the mandrel 10 is preferably made with the cylinder 61*a* as a separate unit as shown.

*Operation*

With the mandrel 10 supported as desired, for example, upon a lathe, a workpiece W may be telescoped thereover and more particularly over the expandable units 56 and 57 thereof. In the particular embodiment shown, contact between the end of the opening H in said workpiece W and the positioning member 41 assures proper axial positioning of the workpiece W. Thereafter the mandrel 10 may be expanded as follows. Rearward axial movement of the plunger 26, and hence of the head 32, causes a corresponding rearward movement of the fingers 51 and, thereby, of the cylinder 61. The rearwardly moving cylinder 61 moves the sleeve 66 through the toothed ridges 62 and 69 rearwardly and thereby moves the cylindrical spacer 58 and hence the sleeve 66*a* rearwardly. Since the cylinder 61*a* is blocked from rearward movement by the shoulder 22, rearward movement of the sleeve 66*a* results in radial expansion thereof. The sleeves 66 and 66*a* are preferably constructed of a substantially rigid, elastically deformable material and tend to resist such expansion. This resistance to expansion of the sleeve 66*a* impedes to some extent continued rearward axial movement of the cylindrical spacer 58 resulting in a net compression of the unit 57 and the sleeves 66 and 66*a* expand. The diameters of identical sleeves 66 and 66*a*, when said sleeves are tightly gripping the wall of the opening H, will differ if the adjacent portions of the opening H differ in diameter. Since the sleeves 66 and 66*a* are expandable through a range of diameters, the same mandrel 10 is therefore capable of firmly and properly gripping workpieces whose openings H vary both in diameter through a relatively wide range from workpiece to workpiece and at different axial locations in a given workpiece.

Figure 2:
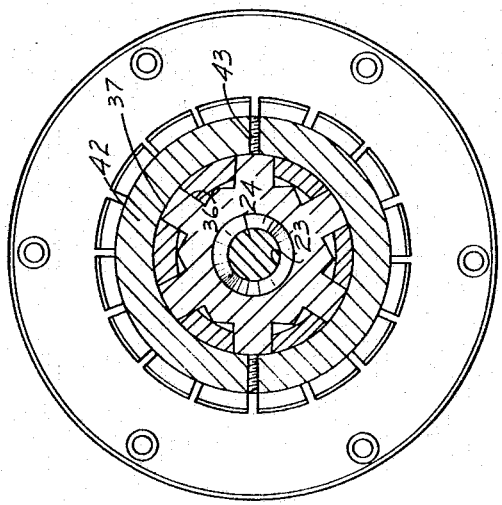
FIGURE 2 is a sectional view taken on the line II—II of FIGURE 1.

In the particular embodiment shown in FIGURE 1, the sleeves 66 and 66*a* both move rearwardly as they expand into contact with the workpiece W. Thus, the final portion of their expansion is accompanied by rearward movement thereof. Since the sleeves 66 and 66*a* frictionally engage the workpiece W before reaching their final expanded state, said workpiece will be urged rearwardly thereby to tend to make firmer the seating of the workpiece W against the positioning member 41. If desired, instead of the flange 46 on the member 41, suitable stop means of any convenient type, not shown, may be provided between the radial flange 12 and the workpiece W for providing a positioning abutment against which the workpiece W may be seated.

Release of the workpiece W from the mandrel 10 is readily accomplished by allowing the plunger 26 to move forwardly. This allows the sleeves 66 and 66*a*, the cylinder 61 and fingers 51 to move forwardly whereby the sleeves 66 and 66*a* are allowed to contract. Such contraction as well as the forward movement of the aforementioned elements is preferably a result of the elastic properties of the sleeves 66 and 66*a*.

It will be recognized that the expandable units 56 and 57 may differ in axial length and diameter from each other and with the cylindrical spacer 58 may be differently proportioned to fit the needs of a particular workpiece. More than two expandable units may be used, the spindle portion 19 for supporting an extra long or thin walled workpiece. Moreover, the afore-mentioned variations except those requiring a change in spindle length may be achieved without replacing the arbor 11, plunger 24 or finger 51.

With no workpiece W on the mandrel 10, the units 56 and 57 and spacer 58 are readily replaced. The positioning device 41 is removed by loosening the set screws 43. The fingers 51 may then be removed whereafter the units 56 and 57 and spacer 58 may be slid off the forward end of the arbor 11. The mandrel 10 may be reassembled by reversing the above process.

The mandrel 10 may be used even in cases where portions of the workpiece opening H are somewhat eccentric. Such an eccentric portion of the workpiece opening H may be supported by allowing a radial clearance between the adjacent one of the cylinders and the spindle portion 19 whereby the expandable unit in question is allowed to continuously and firmly contact the eccentric portion of the opening H by moving into an eccentric position with respect to the arbor 11. In a particularly example, the clearance allowed was .020 inch. Thus, the full circumference of a portion of a thin walled workpiece W surrounding an eccentric portion of the opening H may be firmly supported against deformation. Moreover, friction between the eccentric unit and the members axially contacting same will tend to maintain said eccentric unit in the same angular position on the arbor 11 despite the lack of full circumferential contact with the spindle portion 19.

Although the spindle portion 19 is cylindrical in the embodiment of the invention shown, it is fully contemplated that said spindle portion may be radially stepped preferably between units 56 and 57 and that the internal diameters of the cylinders 61 and 61*a* may differ substantially for snugly engaging radially stepped portions of the spindle. In this manner the mandrel 10 would be capable of radially engaging the stepped portions of a workpiece opening with units having sleeves and cylinders of similar peripheral wall thickness.

*Modification*

FIGURE 4 discloses a modified mandrel 80. Parts of the mandrel 80 similar to parts of the mandrel construction 10 hereinabove described will be referred to by the same reference numerals with the suffix "*b*" or "*c*" added thereto. The mandrel construction 80 is substantially similar to the mandrel construction 10 except for a modified rearward unit 81. More specifically, the unit 81 may be identical to the unit 56 but is axially reversed in orientation with respect to the spindle portion 19. Thus, the rearward end of the sleeve 66b of the modified unit 81 bears against the radially extending shoulder 22a, and the forward end of the cylinder 61b of said unit 81 bears against the rearward end of the spacer 58b. Thus rearward movement of the spacer 58b moves the sleeve 61b rearwardly along the spindle portion 19b to expand the sleeve 66b which sleeve does not move axially during expansion thereof.

In a similar manner the forward unit 57b might be axially reversed if the fingers 51b were sufficiently radially extended as to act upon the sleeve 66c of the unit 57b rather than upon the cylinder 61c thereof as shown in FIGURE 4. Such an arrangement would, however, not prevent axial movement of the unit 57b.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In an expandable mandrel supporting a workpiece, the combination comprising:
   an elongated arbor;
   first and second axially spaced expandable units disposed on said arbor;
   said first expandable unit comprising a cylinder mounted on said arbor, a sleeve telescoped loosely on said cylinder and relatively slideable ramp means disposed on and radially between said sleeve and cylinder in opposed contact so that relative axial movement in a given direction therebetween results in expansion of said sleeve;
   said second expandable unit comprising a cylinder mounted on said arbor, a sleeve telescoped loosely on said cylinder and relatively slideable ramp means disposed on and radially between said sleeve and cylinder in opposed contact so that relative axial movement in said given direction therebetween results in expansion of said sleeve;
   abutment means axially fixed with respect to said arbor for axially engaging one of the sleeve and cylinder of the first expandable unit at one end thereof, said one end facing axially outwardly away from said second expandable unit;
   actuating means axially movable with respect to said arbor toward said abutment means, said actuating means being axially engageable with one of the sleeve and cylinder of the second expandable unit at one end thereof, said one end facing axially outwardly away from said first expandable unit, said first and second units being disposed axially between said abutment means and said actuating means and so arranged that movement of said actuating means toward said abutment means exerts an axially compressive force upon said expandable units for radially expanding same;
   a spacer member slideably mounted on said arbor and disposed between said first and second expandable units, one end of the spacer member being in abutting contact with the other of the sleeve and cylinder of the first unit at the other end thereof, the other end of said spacer member being in abutting contact with the other of the sleeve and cylinder of the second unit at the other end thereof;
   whereby axial movement of said actuating means will effect radial and axial movement of the second expandable unit, which in turn will effect axial movement of the spacer member, the spacer member effecting radial and axial movement of the first expandable unit.

2. The mandrel defined in claim 1 wherein:
   said spacer member comprising an annular member slideably disposed on the arbor in surrounding relationship thereto, said member having transverse end faces at opposite ends thereof in abutting contact with said first and second expandable units, respectively.

3. The mandrel defined in claim 2 wherein:
   the cylinder of said second expandable unit is axially slideably mounted on said arbor and has one axial end thereof in abutting contact with said actuating means, the sleeve of said second unit being in abutting contact with said spacer member;
   the sleeve of said first expandable unit being in abutting contact with said abutment means while the cylinder of said first unit is in abutting contact with said spacer member.

4. The mandrel defined in claim 2 wherein:
   the cylinder of said second unit is axially slideably mounted on said arbor and has one axial end thereof in abutting contact with said actuating means, the sleeve of said second unit being in abutting contact with the said spacer member;
   the sleeve of said first expandable unit being in abutting contact with said spacer member while the cylinder of said first unit is in abutting contact with said abutment means.

5. The mandrel defined in claim 2 wherein:
   said arbor has a central opening extending through the length thereof;
   said actuating means comprising a plunger including an elongated rod slideably disposed in said central opening, said plunger having a radially enlarged head located beyond the end of said arbor furthest from said abutment means;
   a slide member reciprocally mounted on said arbor between said head and said second expandable unit, said slide member having a plurality of axially extending fingers integrally formed thereon and in abutting contact with the head and the second expandable unit at opposite axial ends thereof.

6. The mandrel defined in claim 5 wherein:
   said abutment means comprises a radial shoulder integrally formed on said arbor for limiting the axial movement of said first expandable unit.

7. The mandrel defined in claim 5 including:
   a cylindrical work piece positioning member fixed to the end of said arbor in surrounding relationship with said plunger head, and being engageable with a radial portion of a work piece telescoped over the mandrel for limiting axial movement of said work piece in whereby axial movement of said plunger towards said units during expansion thereof.

8. The mandrel defined in claim 5 wherein:
   the cylinder of at least one of said first and second units is loosely fitted to the arbor for assuming an eccentric position with respect thereto whereby said mandrel may support a work piece having an opening comprising eccentrically located parts.

9. In an expandable mandrel for supporting a work piece, the combination comprising:
   an elongated substantially cylindrical arbor;
   a pair of expandable units disposed on said arbor, each unit comprising a cylinder axially slideable on said arbor, a sleeve disposed loosely on said cylinder and relatively slideable ramp means disposed on and radially between said sleeve and cylinder in opposed contact so that relative axial movement in a given direction results in the expansion of said sleeve;
   a cylindrical spacer snugly and slideably disposed on said arbor between said expandable units;
   abutment means comprising a shoulder adjacent one end of said arbor and axially fixed with respect thereto, one of said expandable units being disposed adjacent said shoulder with the end of the sleeve thereof in bearing engagement with said shoulder and the opposite end of the cylinder of said unit bearing against the adjacent end of said spacer;

actuating means axially movable with respect to said arbor toward said abutment means, said actuating means including a plunger mounted for reciprocation on said arbor and having a head adjacent the other end of said arbor from said shoulder, one end of the sleeve of the other expandable unit bearing on said spacer and the opposite end of the cylinder of said other unit bearing on said actuating means;

whereby axial movement of said plunger toward said shoulder exerts an axial compressive force upon said expandable units resulting in axial movement of the cylinder of the other unit and the cylinder of the one unit for effecting radial movement of said expandable units.

10. In an expandable mandrel for supporting a work piece, the combination comprising:

an elongated substantially cylindrical arbor;

a pair of expandable units disposed on said arbor, each unit comprising a cylinder axially slideable on said arbor, a sleeve disposed loosely on said cylinder and relatively slideable ramp means disposed on and radially between said sleeve and cylinder in opposed contact so that relative axial movement in a given direction results in the expansion of said sleeve;

a cylindrical spacer snugly and slideably disposed on said arbor between said expandable units;

abutment means comprising a shoulder adjacent one end of said arbor and axially fixed with respect thereto, one of said expandable units being disposed adjacent said shoulder with the end of the cylinder thereof in bearing engagement with said shoulder and the opposite end of the sleeve of said unit bearing against the adjacent end of said spacer;

actuating means axially movable with respect to said arbor toward said abutment means, said actuating means including a plunger mounted for reciprocation on said arbor and having a head adjacent the other end of said arbor from said shoulder, one end of the sleeve of the other expandable unit bearing on said spacer and the opposite end of the cylinder of said other unit bearing on said actuating means;

whereby axial movement of said plunger towards said shoulder exerts an axial compressive force upon said expandable units resulting in axial movement of the cylinder of the other unit and the sleeve of the one unit for effecting radial movement of said expandable units.

References Cited

UNITED STATES PATENTS

| | | | |
|---|---|---|---|
| 2,573,928 | 11/1951 | Peter | 279—2 |
| 2,647,701 | 8/1953 | Cannard | 279—2 |
| 2,684,854 | 7/1954 | Hohwart | 279—2 |
| 2,734,749 | 2/1956 | Benjamin | 279—2 |
| 2,738,980 | 3/1956 | Spahn | 279—2 |
| 2,739,818 | 3/1956 | Benjamin et al. | 279—2 |
| 2,970,842 | 2/1961 | Drew | 279—2 |
| 2,859,041 | 11/1958 | Sloan | 279—2 |
| 3,073,610 | 1/1963 | Mackinder | 279—2 |
| 3,076,661 | 2/1963 | Benjamin et al. | 279—2 |
| 3,117,797 | 1/1964 | Buck | 279—2 |

ROBERT C. RIORDON, *Primary Examiner.*

LESTER M. SWINGLE, *Examiner.*

E. CARPENTER, H. V. STAHLHUTH,
*Assistant Examiners.*